No. 864,579. PATENTED AUG. 27, 1907.
W. G. VOLZ.
WATER METER.
APPLICATION FILED OCT. 20, 1906.
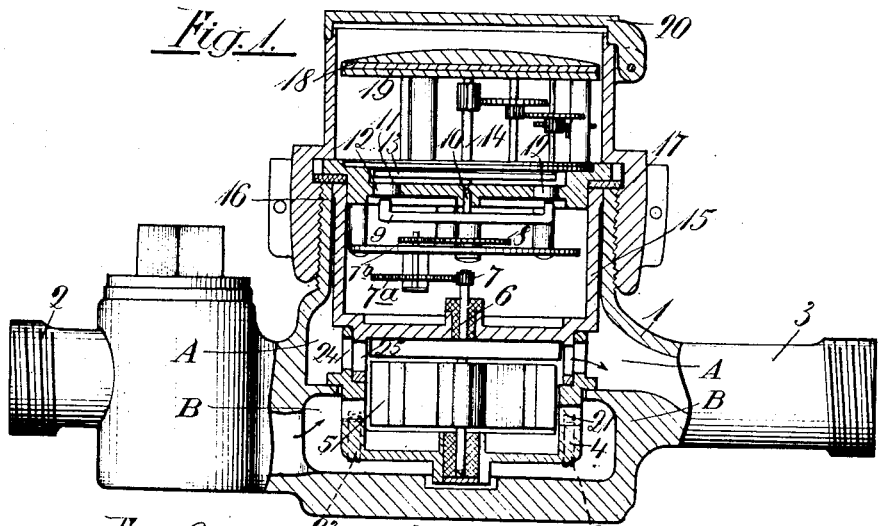
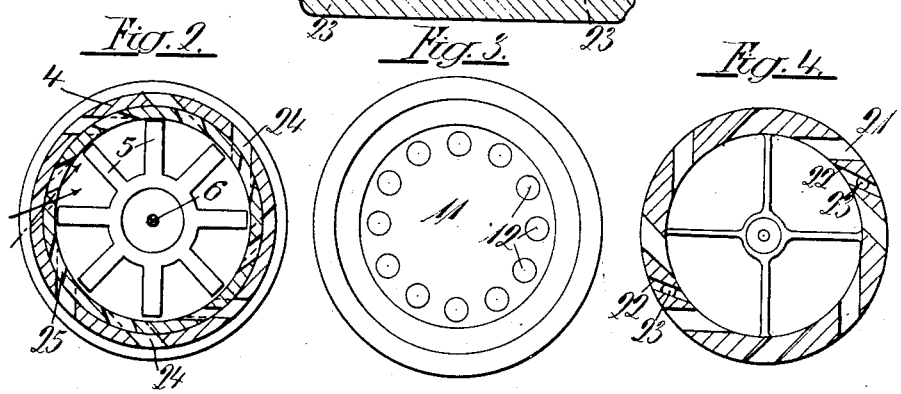
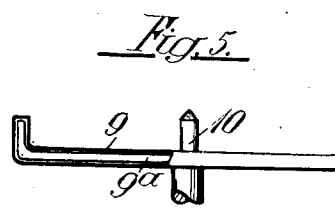
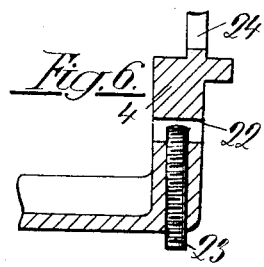
WITNESSES;
INVENTOR,
WILHELM GOTTLOB VOLZ,
BY
Attorney.

UNITED STATES PATENT OFFICE.

WILHELM GOTTLOB VOLZ, OF STUTTGART, GERMANY.

WATER-METER.

No. 864,579.   Specification of Letters Patent.   Patented Aug. 27, 1907.

Application filed October 20, 1906. Serial No. 339,772.

*To all whom it may concern:*

Be it known that I, WILHELM GOTTLOB VOLZ, a citizen of the German Empire, residing at Stuttgart, in the Kingdom of Würtemberg, Empire of Germany, have invented certain new and useful Improvements in Water-Meters, of which the following is a description, reference being had to the accompanying drawing and to the letters and figures of reference marked thereon.

This invention has for its object a water meter with magnetically operated indicating mechanism, in which the numerous drawbacks which such apparatus have hitherto shown, are avoided. Above everything incorrect registrations frequently take place which arise substantially from the magnetic action of the magnet hitherto employed which is of comparatively small dimensions not passing in sufficient strength through the partition, which is a non-conductor of magnetism, which separates the indicating mechanism from the water chamber, to transmit the movement of the float or paddle wheel in a sure manner correctly to the indicator. The arrangement of a larger number of more powerful magnets is on the other hand too complicated and expensive and also their weight is so great that thereby the sensitiveness of the water meter is considerably affected. The registrations may also be wilfully interfered with as the magnet arranged in the dry chamber is able to be attracted or held up from the outside by means of a powerful magnet, while the bucket wheel itself continues to work, that is to say water might be withdrawn from the pipe unregistered. The drawback also exists that the magnets made of hard steel rapidly rust in the water chamber, and then only work irregularly, or gradually cease to exert any action. A drawback in water meters also consists in the difficulty of adjusting or regulating the quantity of the water flowing through, both forward and backward, which has hitherto been effected by special adjustments of the bars provided for this object above and below the bucket or paddle wheel. Of course this arrangement is extremely inconvenient and an exact adjustment can only be attained with difficulty.

All these drawbacks are removed by the present invention, in which, in place of a partition non-susceptible to magnetism, another such having places provided with means for conducting magnetism is employed, while the magnets arranged in the water chamber or magnet containers are provided with a non-rusting coating for which object, for instance, nickel is very well adapted.

In order to avoid interruptions in the registering during the withdrawal of water, the water meter according to the present invention is surrounded with an iron casing at those places at which an action on the magnet was possible from the outside, which casing renders any attempted holding up of the magnet of the indicating mechanism impossible. For this object an overlapping cap of iron is arranged which also holds together the separate inserted parts of the water meter and is provided above with a lid which allows inspection of the registration. In order also to prevent any action from above when the lid is open, an iron plate is provided under the, usually enameled, indicating or dial plate. Now in order to be able to suitably regulate the quantity of water flowing through, the vane or blade wheel is arranged in a casing which is provided with tapering inlet and outlet apertures. The outlet apertures, which serve for inlets when the water flows backward, are here inclosed by an exactly adjusted flange or edge surrounding an adjustable socket or sheath which is provided with suitable ports, closed more or less according to their position, so that by a simple adjustment of this socket or sheath the quantity of water flowing through, may be regulated. Other passages are also provided for finer regulation, which passages may be closed more or less by set screws, so that a perfectly exact regulation, corresponding to any pressure, is possible.

The object of the invention is shown in the accompanying drawings:—

Figure 1 is an axial vertical section of a water meter according to the present invention; Fig. 2, a cross section (on the line A—A of Fig. 1) of the mechanism regulating the water flowing through; Fig. 3, a plan view of the partition which allows the magnetism to pass through it; Fig. 4, a cross section (on the line B—B of Fig. 1) of the outer case of the paddle wheel and explains the arrangement of the finer regulation; Fig. 5 shows on an enlarged scale in side view and partial section the magnet provided with a non-rusting coating; and Fig. 6 is a vertical section of the mechanism for the finer regulation.

The water meter 1 according to the present invention is provided in the ordinary manner with an inlet nozzle 2 and an outlet nozzle 3. A paddle or bucket wheel 5 for recording the quantity of water passing through, is arranged in a fixed casing 4, which wheel is mounted on a revolubly mounted shaft 6. A face wheel 7 is arranged on the shaft 6 for transmitting the rotary motion of the paddle or float wheel 5 to the indicating mechanism, which wheel 7 sets in motion, by means of transmission wheels $7^a$, $7^b$ and 8, the magnet 9 of the water chamber and the relation of the wheels is such, that even with a rapid rotation of the float wheel 5 the magnet 9 only slowly rotates. The latter is provided with a non-rusting and yet magnetism-conducting coating $9^a$ (Fig. 5). The magnet 9 is mounted on a revoluble shaft 10 the upper end of which is journaled in a partition 11, which tightly shuts off the indicating mechanism from the water chamber. This partition is provided with continuous non-oxidizing plugs 12 (Fig. 3), which are adapted to conduct the magnetism of the magnet 9 through the partition 11, so that it is in a condition to sufficiently exert its action on the magnet 13 of the indicating mechanism. The magnet 13 is mounted on a revoluble shaft 14 which transmits the rotary motion through suitable transmission wheels to the indicator. Now the partition 11 does not lie directly on the water meter case, but on a revoluble socket or sheath 15 and is retained by an overlapping hood-shaped cap 17 screwed over a threaded neck 16 of the water meter case. This nut is made of iron in order to protect the magnets 9 and 13 against magnetic action from the outside, and has a lid 20 adapted to lift up, which, after being opened, allows inspection of the registering mechanism. Now in order also to prevent a magnetic action from above, an iron disk 19 is placed beneath the indicating dial 18, which iron disk is also intended to absorb magnetism coming from the outside.

The socket or sheath 15 may be turned in order to regulate the quantity of water passing through, and is provided with a projection or edge which fits tightly in the case 4. The latter is provided with tapering inlet apertures 21 and outlet apertures 24 for the water which passes through, while the neck of the sheath 15 has passages 25 corresponding to the apertures 24 (Fig. 2), so that by turning the sheath 15, the effective area of the passage may be varied. With the object of a finer regulation, passages 22 are also provided which may be closed more or less by means of set screws 23, so that an exact regulation of the quantity of water flowing through may be obtained by means of this arrangement.

Having now particularly described and ascertained the nature of my said invention and in what manner the same is to be performed, I declare that what I claim is:—

1. In a water meter, a casing having a chamber and divided by a partition provided with plugs of non-rusting magnetic material, indicating mechanism above said partition and a rotatable magnet also above said partition and driving the indicating mechanism, a rotatable magnet and speed-reducing gear for driving the same below said partition, a float wheel in the chamber and connected with said gear, and means for regulating the quantity of water flowing through said chamber.

2. In a water meter, a casing having a chamber and divided by a partition provided with plugs of non-rusting magnetic material, indicating mechanism above said partition and a rotatable magnet also above said partition for driving the indicating mechanism, a rotatable magnet below said partition and provided with a coating of non-rusting magnetic material, speed-reducing gear for driving said magnet, and a float wheel in the chamber and connected with said gearing.

3. In a water meter, a casing having a chamber and divided by a partition provided with plugs of non-rusting magnetic material, indicating mechanism above said partition and a rotatable magnet also above said partition and driving the indicating mechanism, a rotatable magnet below said partition, speed-reducing gear for driving said magnet, a float wheel in the chamber and connected with said gear, and means for protecting both said magnets from external magnetic action.

4. In a water meter, a float wheel, a float chamber wherein said wheel is revolubly mounted and formed by two sheaths one within another, each sheath being movable independently of the other, one of said sheaths being provided with supply apertures having adjustable regulating screws therein, and both of said sheaths provided with coinciding exit apertures the effective area of which may be varied by turning one of the sheaths independently of the other.

In testimony whereof I affix my signature, in presence of two witnesses.

WILHELM GOTTLOB VOLZ.

Witnesses:
WALTER SCHWAEBSCH,
RUDOLF BRECHT.